US008821009B2

(12) United States Patent
Abdelmoneum et al.

(10) Patent No.: US 8,821,009 B2
(45) Date of Patent: Sep. 2, 2014

(54) THERMAL SENSORS HAVING FLEXIBLE SUBSTRATES AND USE THEREOF (75) Inventors: Mohamed A. Abdelmoneum, Portland, OR (US); David A. Kaysen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 538 days.

(21) Appl. No.: 12/646,426

(22) Filed: Dec. 23, 2009

(65) Prior Publication Data

US 2011/0150030 A1    Jun. 23, 2011

(51) Int. Cl.
*G01K 11/26*    (2006.01)
*G01K 7/32*    (2006.01)

(52) U.S. Cl.
USPC ........... 374/117; 374/163; 374/170; 374/178; 374/208; 374/183; 331/154; 331/187; 333/219

(58) Field of Classification Search
USPC ......... 374/163, 141, 177, 178, 170, 183, 184, 374/117–119, 208; 333/219, 234
See application file for complete search history.

(56) References Cited

U.S. PATENT DOCUMENTS

| | | | | |
|---|---|---|---|---|
| 3,230,771 | A * | 1/1966 | Smart et al. | 374/113 |
| 5,041,800 | A * | 8/1991 | Long et al. | 331/69 |
| 5,309,117 | A * | 5/1994 | Cadotte et al. | 331/66 |
| 5,900,736 | A * | 5/1999 | Sovik et al. | 324/663 |
| 6,131,256 | A * | 10/2000 | Dydyk et al. | 29/25.35 |
| 6,706,977 | B2 * | 3/2004 | Cain et al. | 177/210 FP |
| 7,221,230 | B2 * | 5/2007 | Partridge et al. | 331/66 |
| 7,268,646 | B2 * | 9/2007 | Lutz et al. | 333/186 |
| 7,291,561 | B2 * | 11/2007 | Ma et al. | 438/691 |
| 7,312,674 | B2 * | 12/2007 | Duwel et al. | 333/186 |
| 7,378,781 | B2 * | 5/2008 | Vilander | 310/343 |
| 7,449,758 | B2 * | 11/2008 | Axelrod et al. | 257/415 |
| 7,504,899 | B2 * | 3/2009 | McCorquodale et al. | 331/117 R |
| 7,598,825 | B2 * | 10/2009 | Tanaka | 333/186 |
| 7,806,586 | B2 * | 10/2010 | Melamud et al. | 374/117 |
| 7,812,680 | B1 * | 10/2010 | Brown et al. | 331/154 |
| 7,863,697 | B2 * | 1/2011 | Yang et al. | 257/415 |
| 8,049,326 | B2 * | 11/2011 | Najafi et al. | 257/698 |
| 8,179,201 | B2 * | 5/2012 | Lander | 331/154 |
| 8,587,183 | B2 * | 11/2013 | Chen et al. | 310/346 |
| 2003/0051550 | A1 * | 3/2003 | Nguyen et al. | 73/514.36 |
| 2004/0016989 | A1 * | 1/2004 | Ma et al. | 257/528 |
| 2006/0261703 | A1 * | 11/2006 | Quevy et al. | 310/315 |
| 2007/0001773 | A1 | 1/2007 | Oxborrow | |
| 2007/0091971 | A1 * | 4/2007 | Tanaka | 372/82 |
| 2007/0222529 | A1 * | 9/2007 | Carichner et al. | 331/44 |
| 2007/0296527 | A1 * | 12/2007 | Lutz et al. | 333/186 |
| 2008/0144695 | A1 | 6/2008 | Hamada | |

(Continued)

OTHER PUBLICATIONS

International Search Report and Written Opinion for International Patent Application No. PCTUS2010/057164 mailed Jul. 27, 2011, 8 pgs.

*Primary Examiner* — Gail Verbitsky
(74) *Attorney, Agent, or Firm* — Blakely, Sokoloff, Taylor & Zafman LLP (57) ABSTRACT

Methods and apparatuses for Micro-Electro-Mechanical Systems (MEMS) resonator to monitor the platform temperature. Fabricating the resonator on a relatively low cost flexible polymer substrate rather than silicon provides mechanical flexibility as well as design flexibility with respect to sensor placement. Sensor readout and control circuits can be on silicon if desired, for example, a positive feedback amplifier to form an oscillator in conjunction with the resonator and a counter to count oscillator frequency.

10 Claims, 12 Drawing Sheets

(56) References Cited

U.S. PATENT DOCUMENTS

| | | |
|---|---|---|
| 2008/0262773 A1* | 10/2008 | Howell .......................... 702/99 |
| 2008/0285617 A1 | 11/2008 | Moldover et al. |
| 2010/0242765 A1* | 9/2010 | Cruchon-Dupeyrat et al. .......................... 101/463.1 |
| 2010/0315138 A1* | 12/2010 | Namba et al. ................. 327/157 |
| 2011/0095835 A1* | 4/2011 | McCraith et al. ............. 331/158 |
| 2011/0163817 A1* | 7/2011 | Nakamura ....................... 331/18 |
| 2011/0210801 A1* | 9/2011 | Rottenberg et al. ........... 331/156 |
| 2012/0032555 A1* | 2/2012 | Koning et al. ................. 310/315 |
| 2012/0043999 A1* | 2/2012 | Quevy et al. .................. 327/147 |
| 2012/0092083 A1* | 4/2012 | Nakamura ..................... 331/154 |
| 2012/0182077 A1* | 7/2012 | Yamakawa et al. ............. 331/34 |
| 2012/0229220 A1* | 9/2012 | Quevy et al. .................... 331/41 |
| 2013/0075853 A1* | 3/2013 | Gupta et al. .................. 257/467 |

* cited by examiner

THERMAL SENSORS HAVING FLEXIBLE SUBSTRATES AND USE THEREOF

TECHNICAL FIELD

Embodiments of the invention relate to thermal sensors. More particularly, embodiments of the invention relate to design, manufacture and use of Micro Electro Mechanical (MEMS) thermal sensors on a flexible substrate within electronic components and systems.

BACKGROUND

Platform (e.g., computer system, hand held devices like cell phones, mobile internet devices) temperature is currently monitored using thermal diodes or thermistors. These thermal diodes experience junction voltage changes that correspond to temperature changes while thermistors resistance change with temperature. The output voltage from the diode or across the thermistors is then digitized and translated to temperature.

This approach to thermal sensing may limit the number of sensors used because of limiting factors such as cost and package rigidity. This approach may also suffer from low accuracy and may require an analog-to-digital converter to digitize the signal. The requirement of the analog-to-digital converter increases cost and complexity of the host platform.

Further, the diode is manufactured on a solid silicon substrate and packaged in a mechanically rigid package that limits deployment of these sensors to printed circuit board, or printed circuit board like, applications or placement in very specific locations within the platform chassis where mechanical support and electrical traces are available. This limits design options and may further increase system complexity.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Increased thermal sensing may be used to support improved system performance. However, in order to achieve wide acceptance, the costs of increased thermal sensing must be within an acceptable range. Described herein is a resonator structure that may provide an inexpensive, accurate thermal sensing solution that can support increased thermal sensing applications.

In one embodiment, a Micro-Electro-Mechanical Systems (MEMS) resonator to monitor the platform temperature. Fabricating the resonator on a relatively low cost flexible polymer substrate rather than silicon provides mechanical flexibility as well as design flexibility with respect to sensor placement. Sensor readout and control circuits can be on silicon if desired, for example, a positive feedback amplifier to form an oscillator in conjunction with the resonator and a counter to count oscillator frequency.

In one embodiment a thermal sensor that takes advantage of the low deposition temperature of copper to pattern a copper resonator structure on a flexible polymer substrate may be utilized. Using a polymer flexible substrate may enable a very flexible package that can be mechanically and electrically connected to any point in a platform, which provides flexibility of deployment. The sensor may be coupled to the printed circuit board via wires and/or connectors (e.g., ZIF connector), which may allow the sensor to be positioned anywhere within the platform.

Further, use of copper as the resonator structural material may increase the thermal dependence of the resonator frequency on temperature and hence improve the overall sensor accuracy. In one embodiment, the resonator may be connected in a positive feedback topology with a transimpedance amplifier that can be formed on silicon to provide an oscillator. The output of the oscillator is a signal with a frequency that is dependent on the resonator temperature and the frequency is counted with a simple counter circuit that can also be implemented on silicon.

Figure 1:
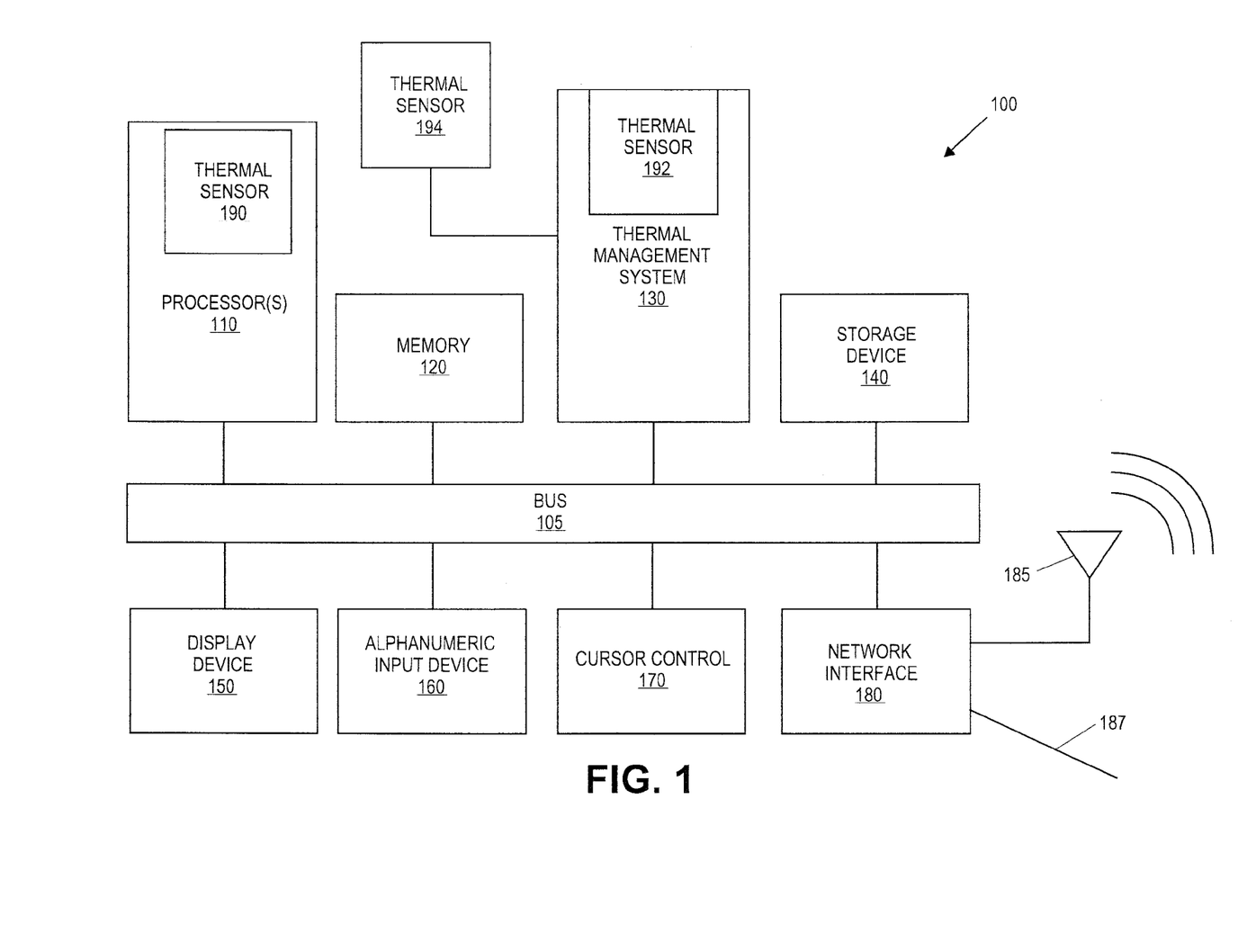
FIG. 1 is a block diagram of one embodiment of an electronic system having thermal sensors.

FIG. 1 is a block diagram of one embodiment of an electronic system having thermal sensors. The electronic system illustrated in FIG. 1 is intended to represent a range of electronic systems (either wired or wireless) including, for example, desktop computer systems, laptop computer systems, cellular telephones, personal digital assistants (PDAs) including cellular-enabled PDAs, set top boxes. Alternative electronic systems may include more, fewer and/or different components.

Electronic system 100 may have any number of thermal sensors, which may include resonator structures and/or thermal diodes. The example of FIG. 1 includes three thermal sensors (190, 192 and 194); however, any number of thermal sensors can be supported. The thermal sensors may be used to monitor temperature of various components and/or areas of electronic system 100.

Electronic system 100 includes bus 105 or other communication device to communicate information, and processor 110 coupled to bus 105 that may process information. While electronic system 100 is illustrated with a single processor, electronic system 100 may include multiple processors and/or co-processors. Electronic system 100 further may include random access memory (RAM) or other dynamic storage device (included in memory 120), coupled to bus 105 and may store information and instructions that may be executed by processor 110. Memory 120 may also be used to store temporary variables or other intermediate information during execution of instructions by processor 110. Memory 120 may also include read only memory (ROM) and/or other static storage device that may store static information and instructions for processor 110.

Electronic system 100 may include thermal management system 130 that may provide thermal monitoring and/or cooling functionality. Thermal management system 130 may include one or more fans and/or one or more liquid cooling mechanisms to cool various components of electronic system 100. Further, thermal management system 130 may include monitoring circuitry to monitor the temperature of various component and areas in electronic system 100. Data storage device 140 may be coupled to bus 105 to store information and instructions. Data storage device 140 such as a magnetic disk or optical disc and corresponding drive may be coupled to electronic system 100.

Electronic system 100 may also be coupled via bus 105 to display device 150, such as a cathode ray tube (CRT) or liquid crystal display (LCD), to display information to a user. Alphanumeric input device 160, including alphanumeric and other keys, may be coupled to bus 105 to communicate information and command selections to processor 110. Another type of user input device is cursor control 170, such as a mouse, a trackball, or cursor direction keys to communicate direction information and command selections to processor 110 and to control cursor movement on display 150.

Electronic system 100 further may include network interface(s) 180 to provide access to a network, such as a local area network. Network interface(s) 180 may include, for example, a wireless network interface having antenna 185, which may represent one or more antenna(e). Network interface(s) 180 may also include, for example, a wired network interface to communicate with remote devices via network cable 187, which may be, for example, an Ethernet cable, a coaxial cable, a fiber optic cable, a serial cable, or a parallel cable.

In one embodiment, network interface(s) 180 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 180 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 2:
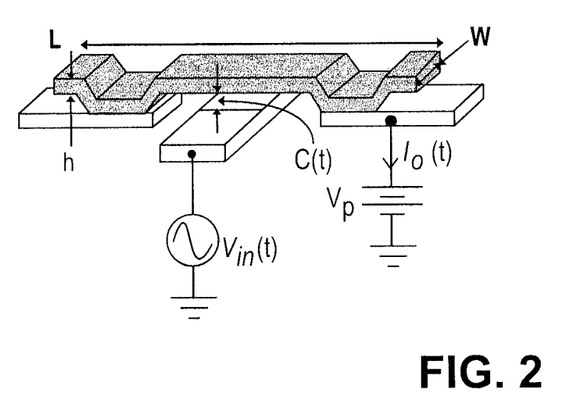
FIG. 2 is a physical representation of one embodiment of a resonator that may be used as a thermal sensor.

FIG. 2 is a physical representation of one embodiment of a resonator that may be used as a thermal sensor. The example of FIG. 2 is that of a clamped-clamped beam MEMS resonator. The frequency of the resonator may be described as:

$$f_o = \frac{1}{2\pi}\sqrt{\frac{k_{\mathit{eff}}}{m_{\mathit{eff}}}} \approx 1.03\sqrt{\frac{E}{\rho}}\frac{h}{L^2}$$

where $k_{\mathit{eff}}$ is the effective stiffness of the resonator material, $m_{\mathit{eff}}$ is the effective mass of the resonator material, E is Young's Modulus and $\rho$ is the density of the resonator material. Thus, as the capacitance, C(t), changes with flexure of the resonator structure, the voltage, $V_{in}(t)$, applied to the resonator structure results in a proportional change in output current, $I_o(t)$.

Figure 3:
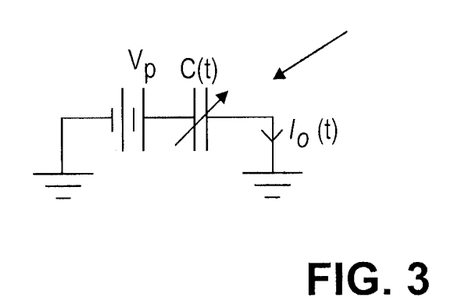
FIG. 3 is a circuit diagram representation of one embodiment of a resonator that may be used as a thermal sensor.

FIG. 3 is a circuit diagram representation of one embodiment of a resonator that may be used as a thermal sensor. The circuit diagram of FIG. 3 models the variable capacitance of the resonator structure as a variable capacitor in which the output current may be described as:

$$i_o = V_p \frac{\partial C(t)}{\partial t}.$$

Figure 4:
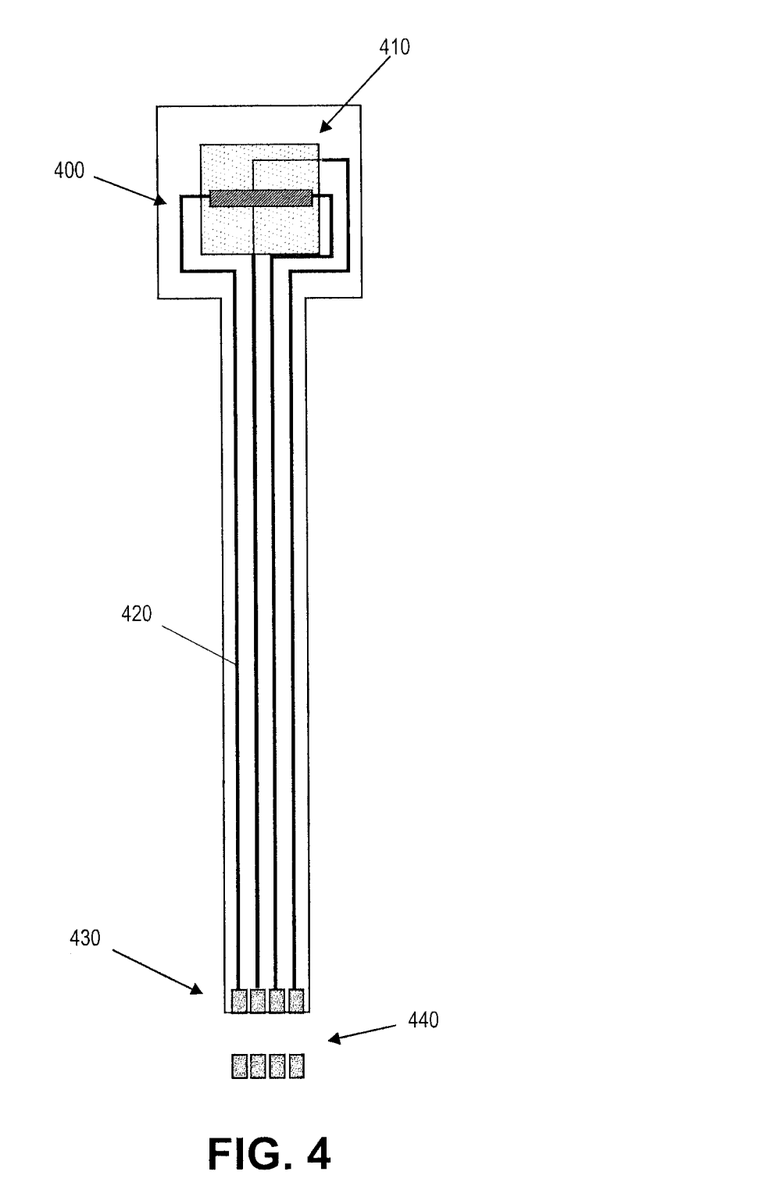
FIG. 4 is a physical representation of a thermal sensor having contacts that can be connected with a connector.

FIG. 4 is a physical representation of a thermal sensor having contacts that can be connected with a connector. Sensor 400 is a MEMS resonator having a copper resonator structure as described above. Flexible substrate 410 may be any size suitable to hold sensor 400. In one embodiment, flexible substrate 410 is large enough to include an area for adhesive to attach flexible substrate 410 to a component of a host system, for example, a system enclosure (not illustrated).

In one embodiment, one or more leads 420 extend from sensor 400 to contacts 430. In one embodiment, leads 420 are fabricated on flexible substrate 410. Leads 420 and contacts 430 allow the placement of sensor 400 to be independent of a motherboard or connector as well as computational elements of a thermal management system.

In one embodiment, connector 440 is located on a motherboard of the host system. Connector 440 may be, for example, a Zero Insertion Force (ZIF) connector that provides an electrical connection via contacts 430. Connector 440 may be connected to other components of the host system via traces on a printed circuit board or physical wires.

Figure 5A:
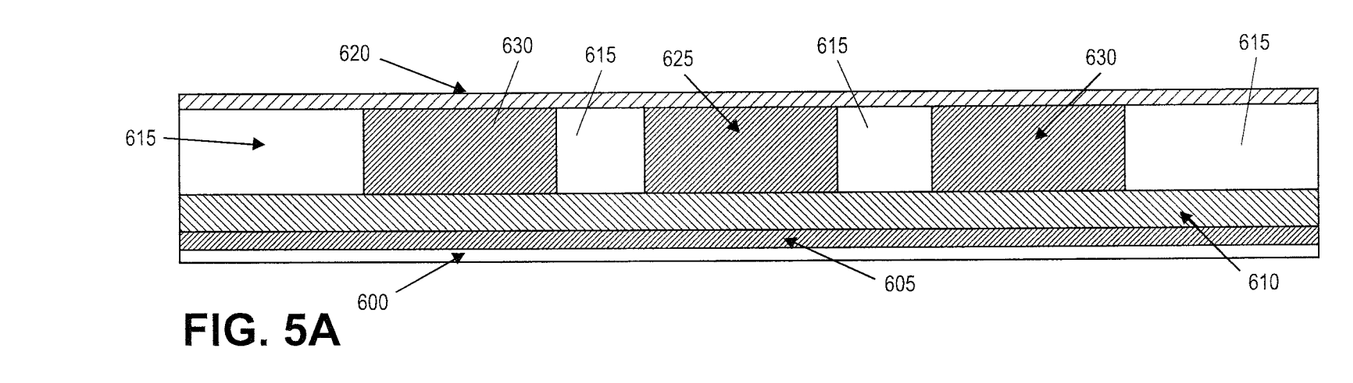
FIGS. 5*a-m* illustrate various steps in one embodiment of a process for manufacturing a MEMS copper resonator structure on a flexible substrate that may be used as a thermal sensor.
Figure 5B:
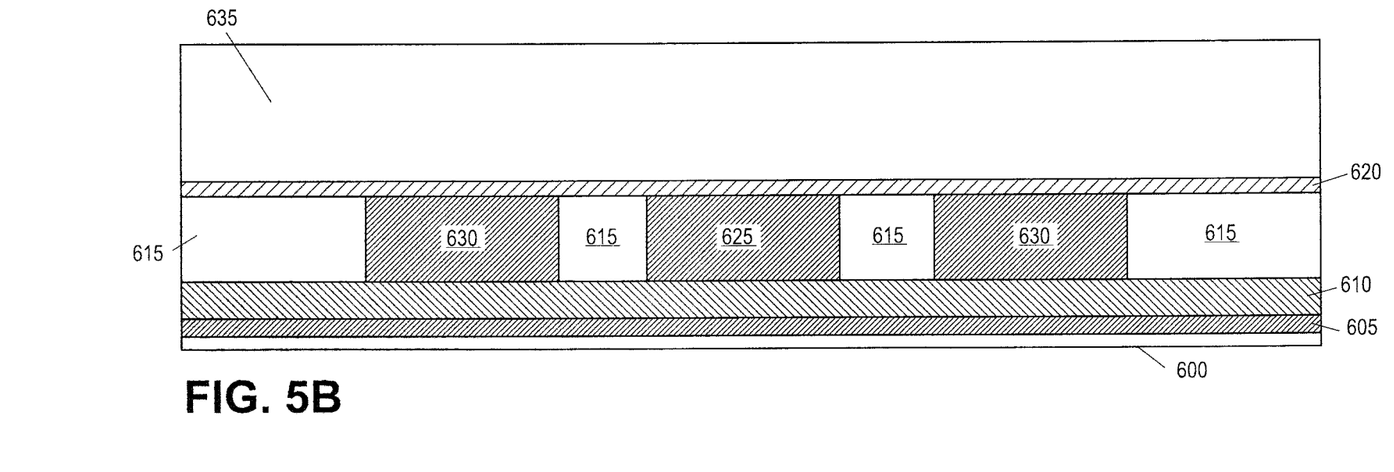

FIGS. 5a-m illustrate various steps in one embodiment of a process for manufacturing a MEMS copper resonator structure on a flexible substrate that may be used as a thermal sensor. FIG. 5a illustrates an early stage of material for manufacturing a MEMS copper resonator structure. Silicon carrier wafer 600 carries photoresist 605 upon which polymer layer 610 has been deposited. In one embodiment, polymer layer 610 is a spin on resist polymer or a pyraline. Inter-Layer Dielectric (ILD) 615, input electrode 625 and output electrode 630 are formed on polymer 610. Etch stop 620 is applied. FIG. 5b illustrates another layer of ILD 635 on etch stop 620.

Figure 5C:
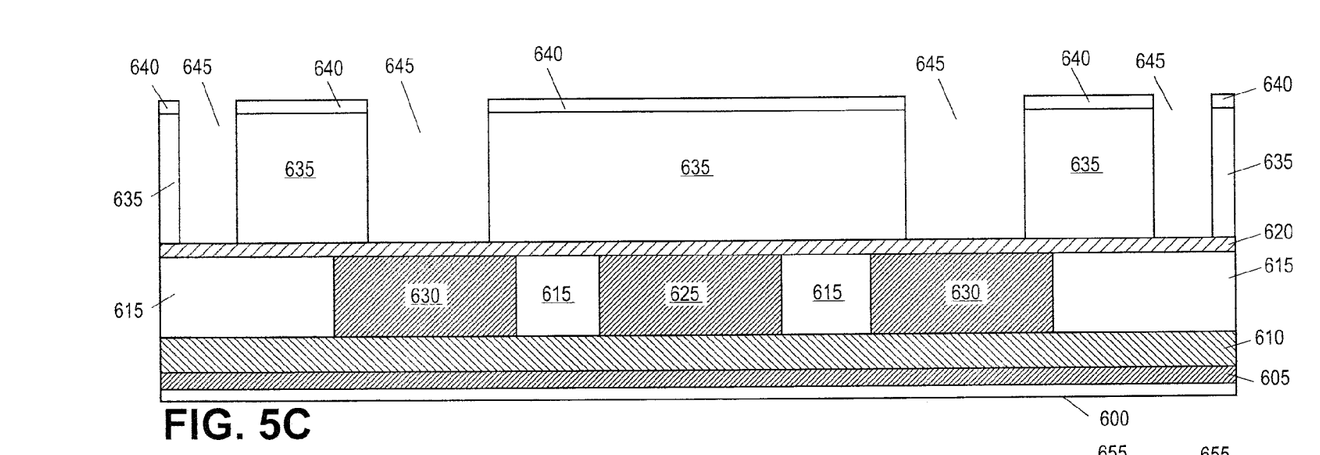
Figure 5D:
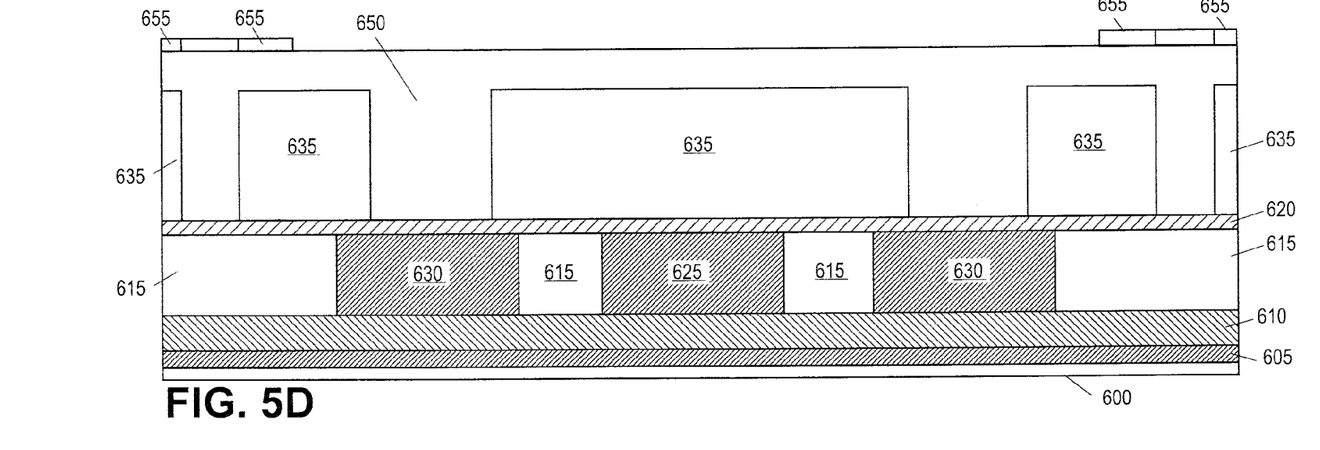
Figure 5E:
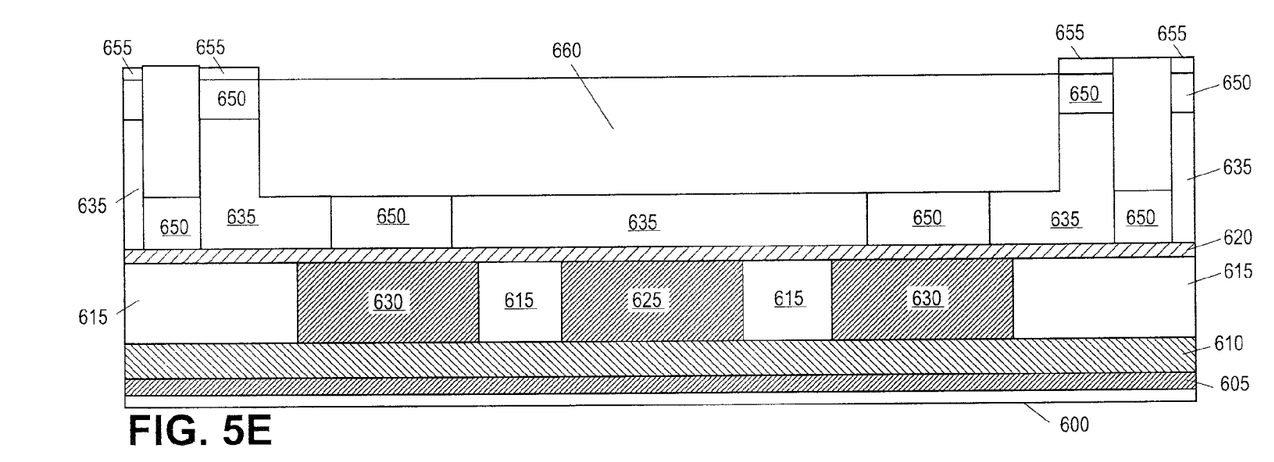
Figure 5F:
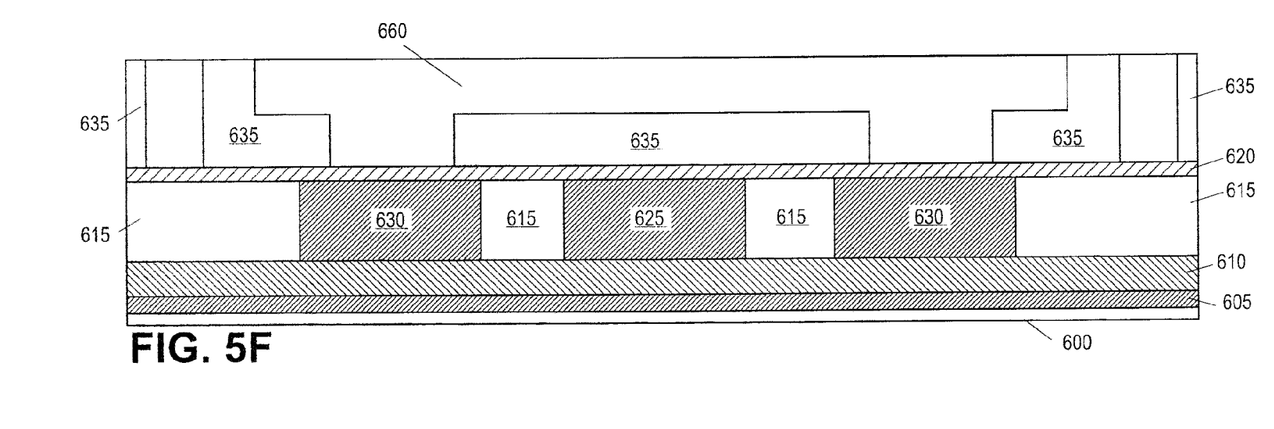

FIG. 5c illustrates ILD 635 after deposition of photoresist 640 and etching of vias 645 in ILD 635. FIG. 5d illustrates deposition of a sacrificial light-absorbing material (SLAM) layer 650, photoresist 655. FIG. 5e illustrates a trench that has been etched defined by photoresist 655. FIG. 5f illustrates the structure after photoresist 655 and SLAM 650 have been stripped.

Figure 5G:
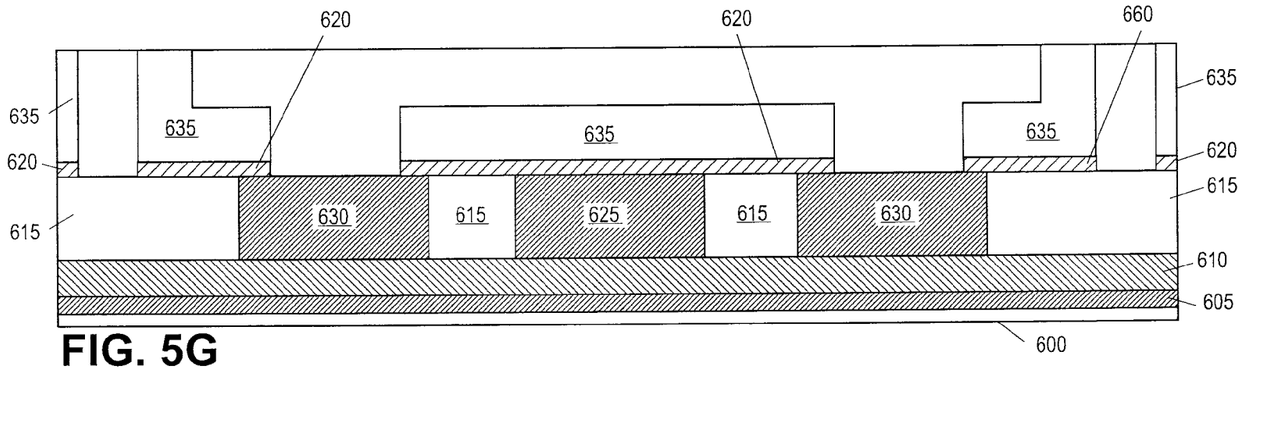
Figure 5H:
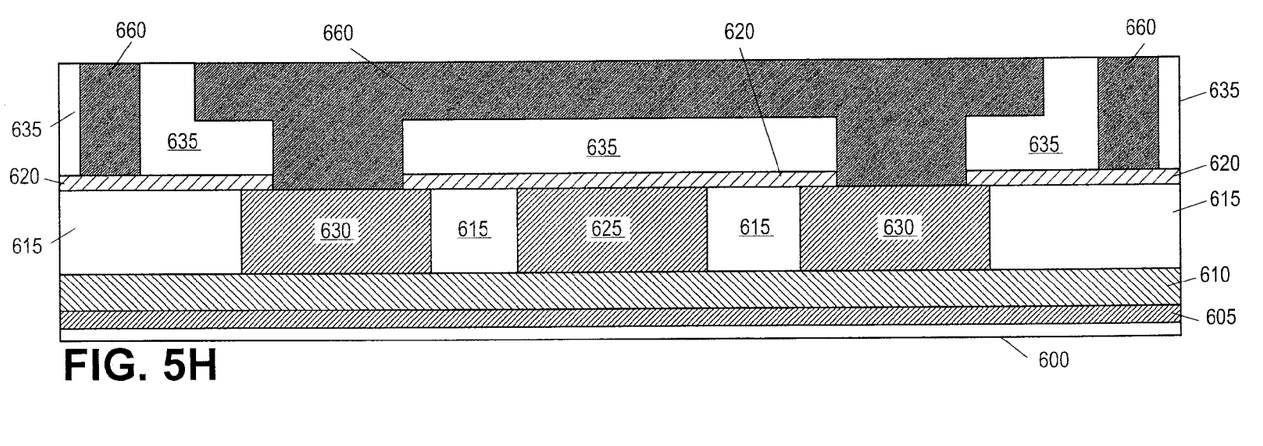
Figure 5I:
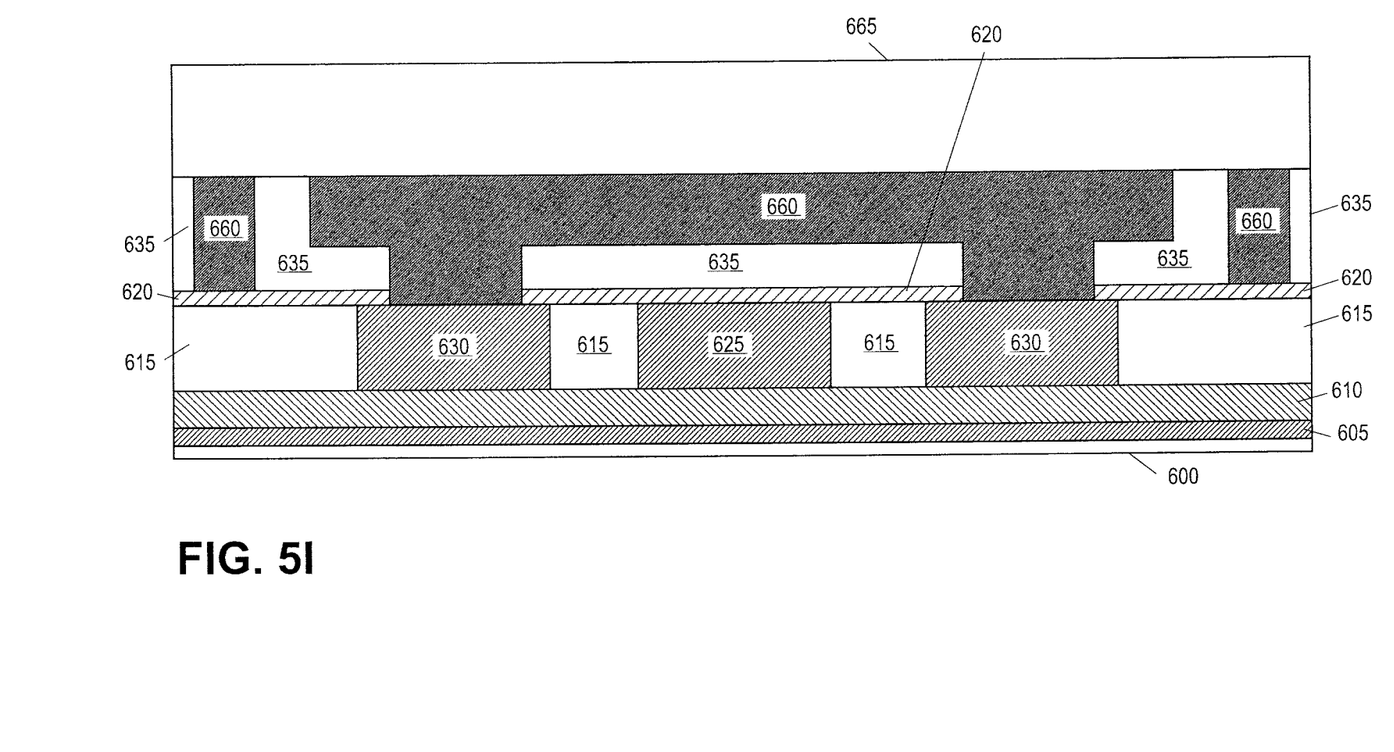
Figure 5J:
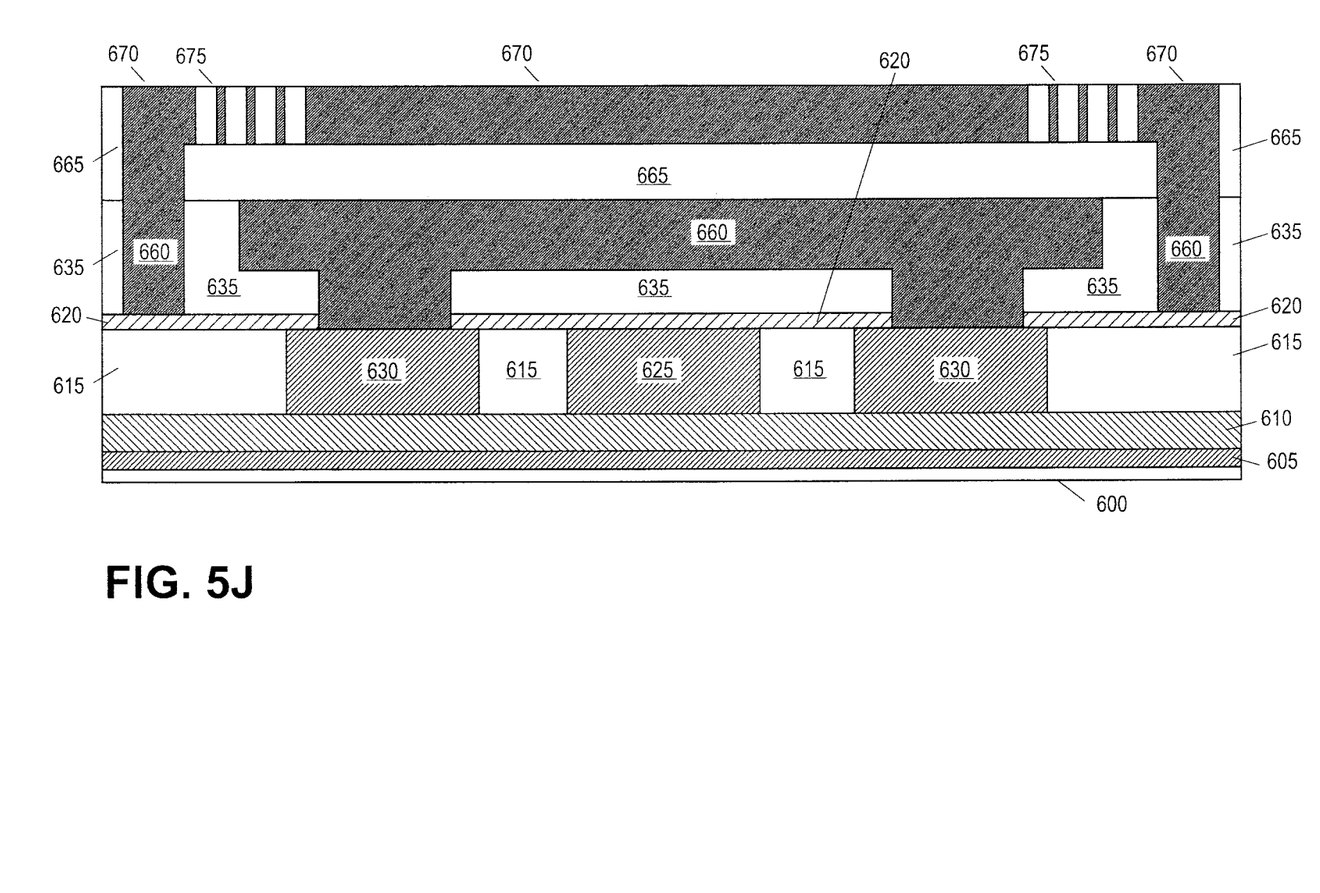
Figure 5K:
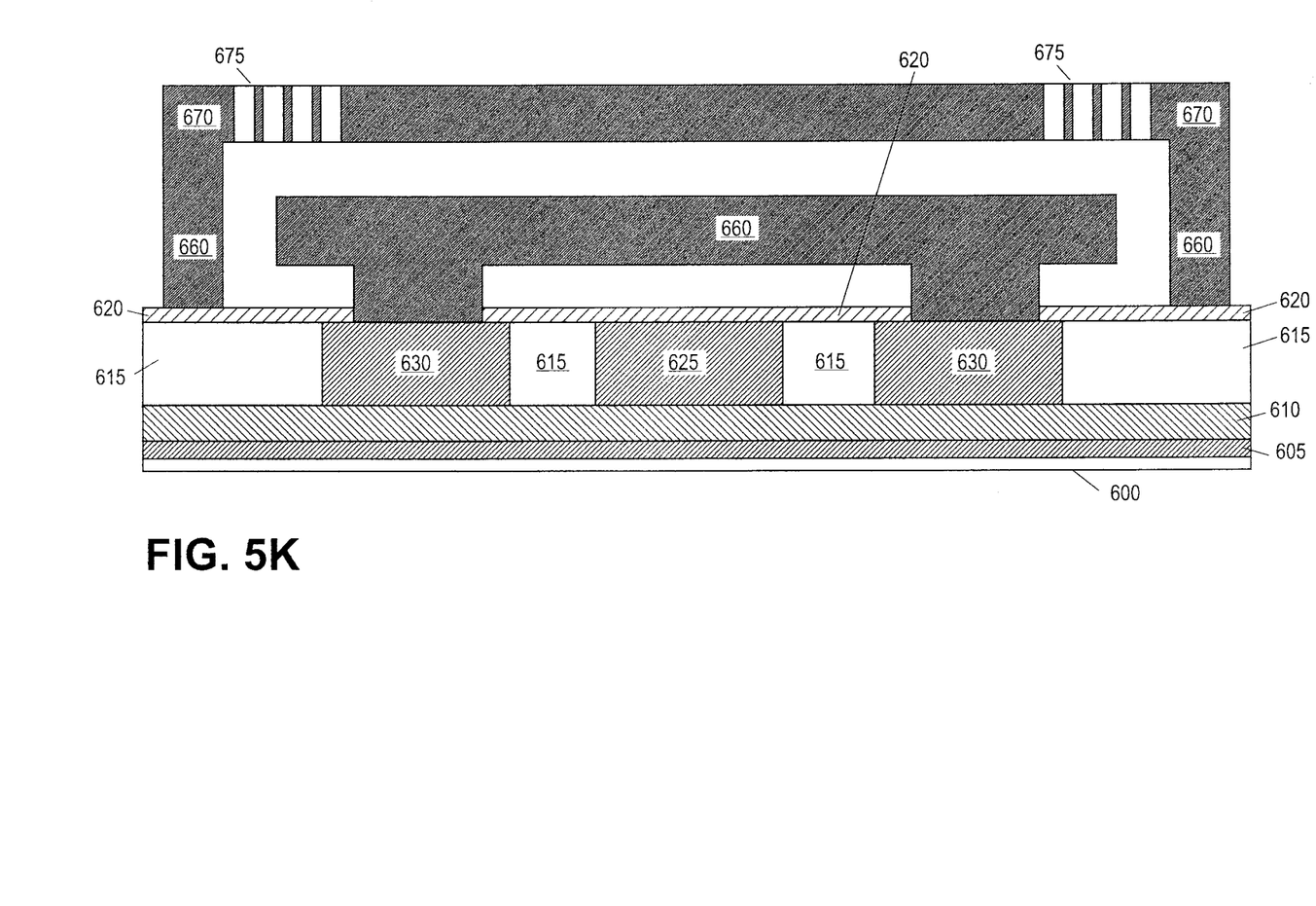

FIG. 5g illustrates the structure after polymer layer 610 has been etched. FIG. 5h illustrates the structure after electroplating of copper 660 and polishing. FIG. 5i illustrates deposition of ILD layer 665. FIG. 5j illustrates patterning of vias 670 and trenching. FIG. 5k illustrates the structure after ILD etching.

Figure 5L:
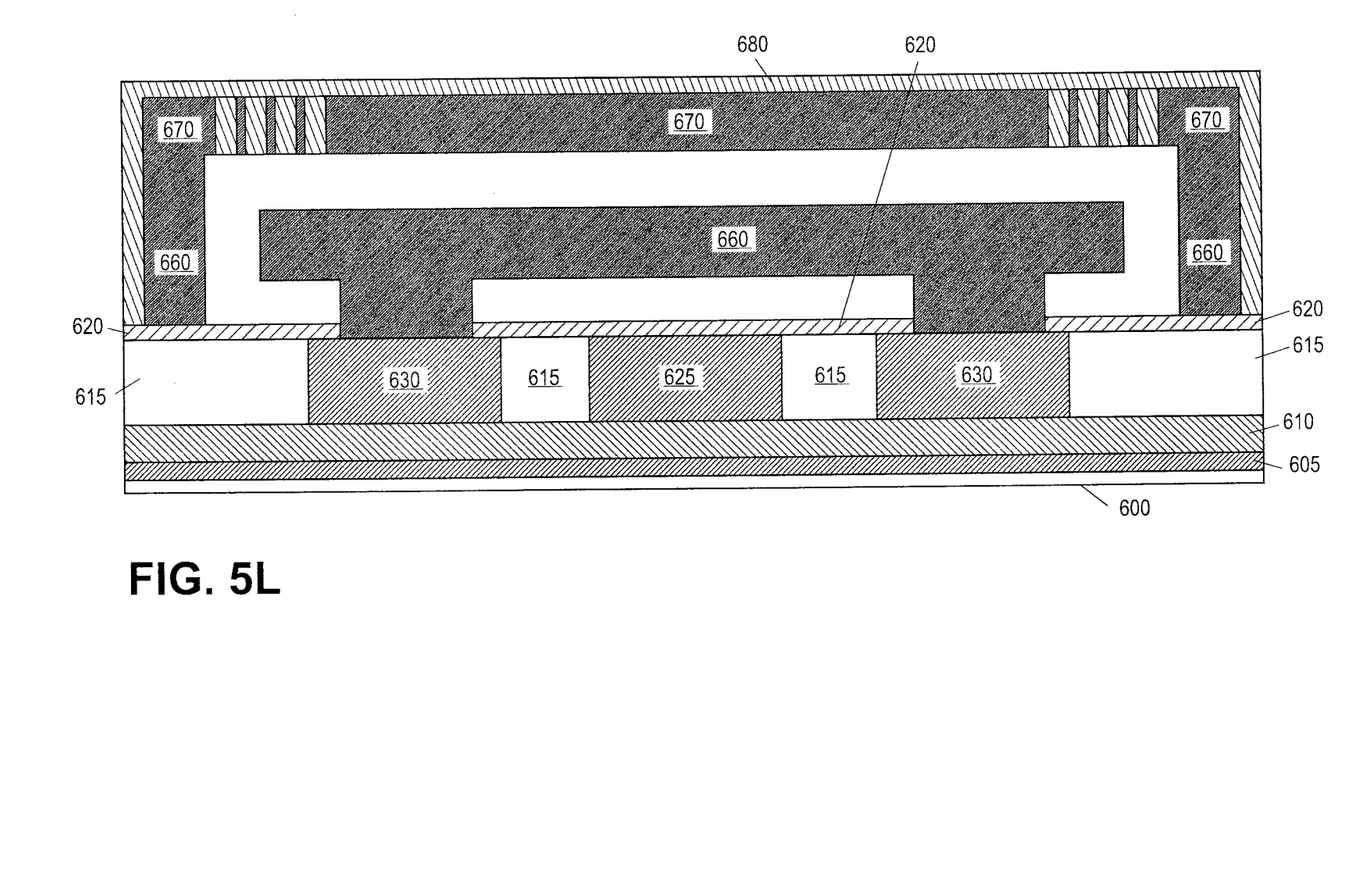
Figure 5M:
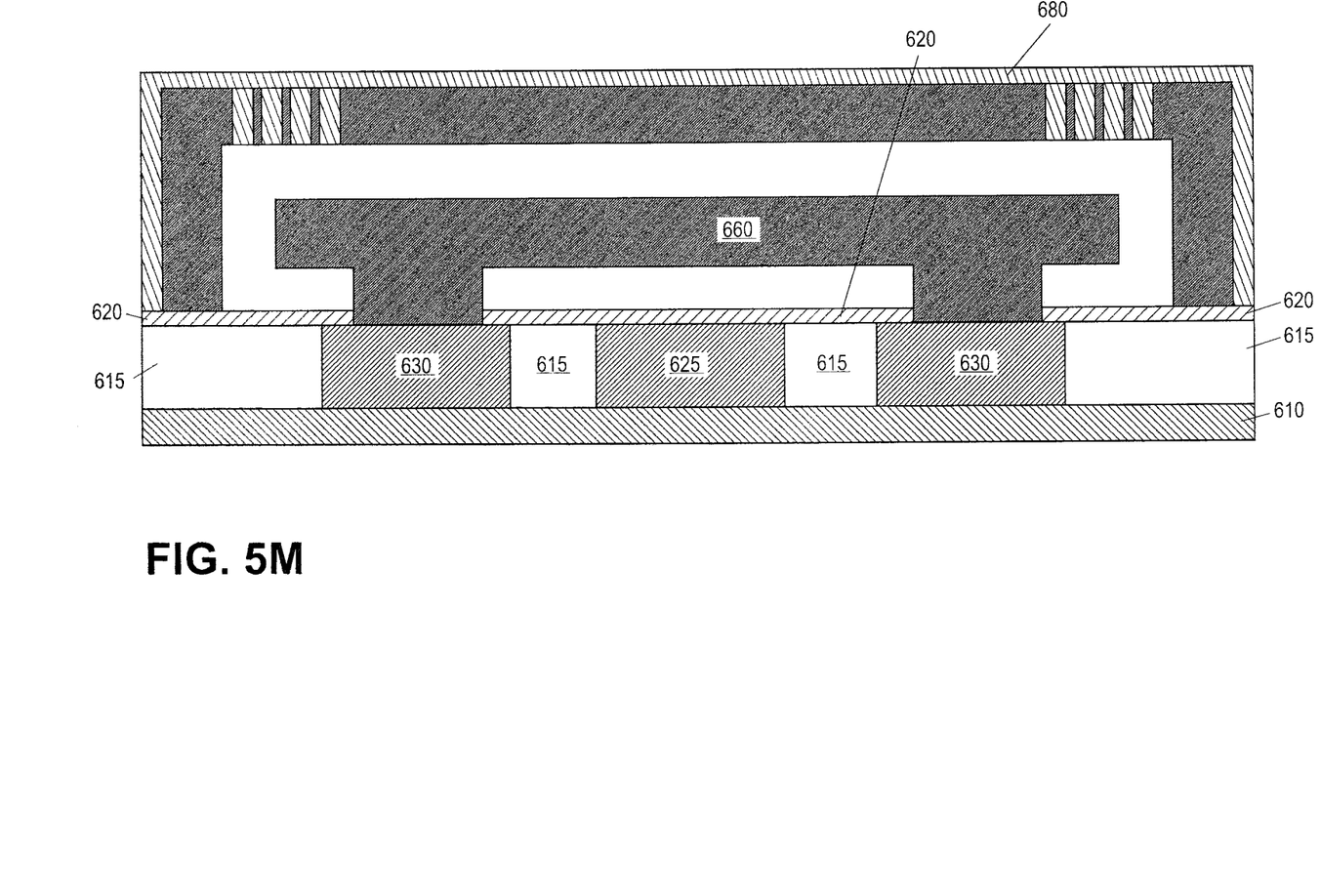

FIG. 5*l* illustrates sealing of etch holes by deposition of ILD or Parylene, 675. FIG. 5*m* illustrates the structure after the carrier wafer has been stripped. The resulting structure is then on a flexible substrate as described above.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:
a flexible substrate having a body portion and an extension portion;
a micro-electro-mechanical system (MEMS) resonator structure disposed on the body portion of the flexible substrate and a plurality of conductors with contacts at one end of the conductors on the extension portion, the resonator structure to provide an output signal over one or more of the conductors corresponding to a temperature detected by the resonator structure;
a connector connected to a printed circuit board, the connector to receive the contacts; and
a circuit coupled with the connector to receive the output signal from the resonator structure and to analyze the output signal to determine the temperature detected by the resonator structure.

2. The system of claim 1 wherein the output signal from the resonator structure comprises a current having a frequency changes as the resonator structure natural frequency changes with temperature of the resonator structure, wherein a voltage applied to the resonator structure results in a proportional change in output current amplitude.

3. The system of claim 2 wherein the oscillator circuit generates a digital output signal with a frequency equal to the frequency of the output current generated from the resonator structure.

4. The system of claim 1 wherein the resonator structure comprises at least a copper resonator.

5. The system of claim 1 wherein the connector comprises a zero insertion force (ZIF) connector.

6. A thermal management system comprising:
a plurality of thermal sensors, each thermal sensor comprising a flexible substrate and a micro-electro-mechanical system (MEMS) resonator structure disposed on a body portion of the flexible substrate and a plurality of conductors with contacts at one end of the conductors on an extension portion, the resonator structure to provide an output signal over one or more of the conductors corresponding to a temperature detected by the resonator structure;
a plurality of connectors connected to a printed circuit board, the plurality of connectors to receive the contacts from one of the plurality of thermal sensors;
a thermal management circuit coupled with the plurality of connectors, the thermal management circuit to monitor the signals from the plurality of thermal sensors, to calculate thermal condition data, and to store the thermal condition data in a memory coupled with the thermal management circuit.

7. The thermal management system of claim 6 wherein the output signals from the resonator structures comprises a current having a frequency changes as the resonator structure natural frequency changes with temperature of the resonator structure, wherein a voltage applied to the resonator structure results in a proportional change in output current amplitude.

8. The thermal management system of claim 7 wherein the oscillator circuit generates a digital output signal with a frequency equal to the frequency of the output current generated from the resonator structure.

9. The thermal management system of claim 7 wherein the resonator structures comprises copper resonator structures.

10. The thermal management system of claim 7 wherein the plurality of connectors comprises a zero insertion force (ZIF) connectors.

* * * * *